Dec. 11, 1928.

R. J. ELLSWORTH 1,695,184

SAFETY LOCK

Filed Dec. 4, 1926

Witness:
William P. Kilroy

Inventor:
Ross J. Ellsworth
Charles S. Wilson
Attys

Patented Dec. 11, 1928.

1,695,184

UNITED STATES PATENT OFFICE.

ROSS J. ELLSWORTH, OF WOODSTOCK, ILLINOIS, ASSIGNOR TO HOLMES DISAPPEARING BED COMPANY, OF WOODSTOCK, ILLINOIS, A CORPORATION OF ILLINOIS.

SAFETY LOCK.

Application filed December 4, 1926. Serial No. 152,588.

This invention relates to safety locks for beds of the roller type and has for its object the provision of a locking mechanism whereby the movement of the head end or truck of the bed relatively to the remainder of the bed structure may be arrested or limited.

With the above and other objects in view, as will be apparent, this invention consists in the construction, combination and arrangement of parts all as hereinafter more fully described, claimed and illustrated in the accompanying drawings wherein:

Figure 1:
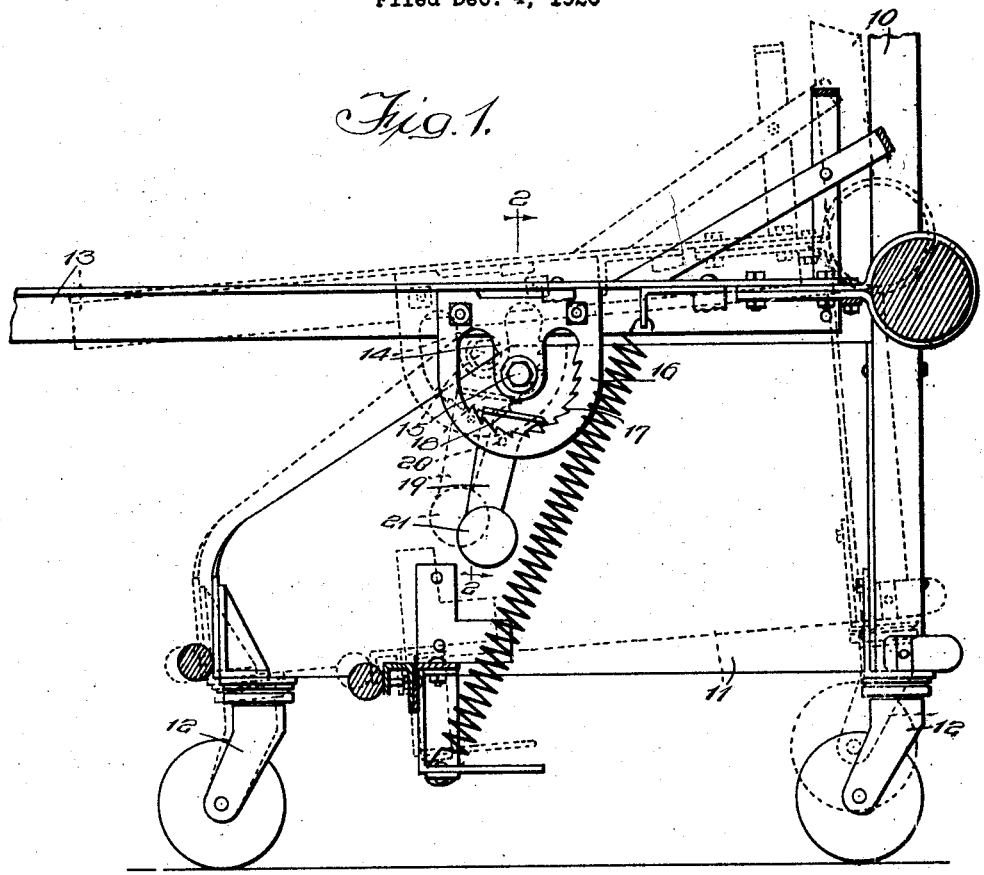
Figure 1 is a longitudinal sectional view through the head end and truck of a roller type bed equipped with the safety lock forming the subject matter of this invention.
Figure 2:
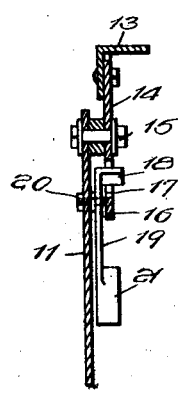
Figure 2 is a vertical section through the safety lock, along line 2—2 of Figure 1.

A roller type bed comprises one wherein the head end is mounted on or constitutes a truck to which is pivoted the side rails of the bed. The foot end of the bed is secured to the outer ends of the side rails and the legs thereof are not provided with casters or rollers as would otherwise be normally the case. In a bed of this type the side rails may be swung about their pivots so that the body of the bed may occupy a vertical position and be supported in this position by the head end or truck, which is mounted on rollers or casters to permit the movement of the structure when the bed is entirely supported by the head end or truck.

When the bed is in its operative position, i. e., when the side rails occupy a horizontal position, the legs of the foot end of the bed rest directly upon the floor without any intervening casters or rollers. A bed of this character may be elevated to rest entirely upon the head end or truck and when in such position may be freely moved from one position to another. However, it is not designed to be moved in its operative or horizontal position with the legs of the foot end resting upon the floor. Any attempt to so move the bed when in this position particularly by the manipulation of the head end or truck will frequently, if not always, cause the truck or head end to swing about the pivots between it and the side rails and collapse upon or swing over on the bed or side rails due to the retarding of the foot end of the bed. Should the bed be occupied when this occurs, the occupant might possibly be injured and in any event the head end of the bed would be collapsed.

The present invention is designed to limit and arrest the movement of the head end or truck of a roller type bed with respect to the side rails when the latter occupy their horizontal or operative positions but not to limit or arrest the normal operation of the foot end and side rails relative to the head end or truck. Thus by the use of the present invention any manipulation of the head end or truck of the bed when the side rails are in their horizontal or operative positions will permit only a very limited movement of said head end or truck relatively to said side rails and the possibility of the head end of the bed collapsing or being turned over on to the bed will be completely overcome.

In practice, the head end 10 of the bed is carried by a truck consisting, among other elements, of the side plate 11 and the casters or rollers 12 secured thereto. The side rails 13 of the bed each have a lug 14 rigidly secured to the lower edge thereof adjoining the head ends thereof. These lugs 14 are pivoted by the bolts 15 to the upper edges of the side plate 11. The foot end of the bed carried by the side rails 13 opposed to the head end 10 is not shown. By this arrangement, the side rails 13 together with all of the elements carried thereby, such as the foot end, springs, mattress, etc., may be swung from the horizontal position illustrated in full lines in Fig. 1 to a vertical position parallel to the head end 10 and vice versa.

When the side rails occupy the horizontal or full line position of Fig. 1 the foot end of the bed (not shown) rests on the floor. If under normal conditions the head end 10 of the bed is grasped and a pressure placed thereon towards the rails 13 the forward rollers or casters 12 will remain on the floor while the rear casters or rollers 12 will be elevated as the head end 10 assumes a position at an angle to the rails 13 as illustrated in dotted lines in Fig. 1. Unless this movement is limited or arrested, a continued pressure on the head end 10 of the bed will cause the truck and head end 10 to continue the movement around the pivots 15 until the head end drops or falls over on the rails 13 and any other elements carried by said rails.

In order to arrest or limit such movement, an arcuate plate 16, having the teeth 17 on the inner edge thereof, is concentrically arranged with respect to one of the pivot bolts 15 of the side rails 13. Cooperating with the toothed edge 17 of the plate 16 is a pawl 18 carried at the upper end of the lever 19. This lever 19 is pivoted, as at 20, to the side plate 11 between the arcuate plate 16 and said side plate so that the pawl 18, which is laterally arranged with respect to the lever 19, will be disposed above the toothed edge 17 of the arcuate plate 16. The lower end of the lever 19 is provided with a weight 21 by means of which the lever 19 occupies a substantially vertical position irrespective of the position of the truck or of the side plate 11.

When the head end or truck 10 is tilted about the forward roller or caster 12 to the dotted line position shown in Fig. 1 the arcuate plate 16 will be so positioned by such movement that it will be engaged by the pawl 18. This result is obtained by the weight 21 of the lever 19 swinging the pawl so that its position with reference to the arcuate plate during and after the tilting action is changed whereby the operative or toothed end of the pawl engages the teeth 17 and arrests or limits any further movement on the part of the head end or truck 10.

In other words, when all four casters 12 are resting on the floor, the side rails 13 together with the elements carried thereby may be swung freely about their pivots 15 without interruption or arrestation; the teeth 17 of the arcuate plate 16 passing the operative end or tooth of the pawl without engaging the same. However, if the position of the head end or truck is changed with respect to the side rails 13 the relative positions occupied by the pawl 18 and the arcuate plate 16 are changed due to the pivoted mounting of the pawl and the gravity weight 21 to throw the tooth or operative end of the pawl into the path of the teeth to be engaged thereby.

By this device and the arrangement heretofore described the movement of the head end or truck 10 beyond a given point is arrested or limited so that said head end may not swing over to and rest upon the side rails 13 or the bed elements carried thereby when in their operative positions. At the same time the device does not in any manner interfere with the normal movement or operation of the side rails relatively to the side plate or head end 10.

What is claimed is:

1. The combination with a support, of rails, means by which the rails are pivoted for an unarrested swing in both directions relative thereto, and means for arresting the movement of said support relatively to said rails, comprising a ratchet carried by the rails concentrically with respect to the pivots thereof, and a weighted pawl pivotally mounted on the support for cooperation with the ratchet upon the movement of said support relatively to the rails aforesaid.

2. The combination with a support, of a bed frame pivoted thereto, a toothed rack carried by said frame and disposed at the pivot thereof, and a pawl pivoted to said support to engage with said rack upon the support assuming an abnormal position and to release said rack upon the return of the support to its normal position.

3. The combination with a support, of a bed frame pivoted thereto, of a curved toothed rack carried by said frame concentrically with respect to the pivot of the frame, and a weighted pawl pivoted to said support eccentrically with respect to the frame pivot, to automatically engage said rack on the movement of the support relatively to the frame and to automatically release said rack on the return movement of the support.

4. In a bed, the combination of a supporting structure, a bed frame pivoted to said structure, and normally inoperative means intermediate of the ends of the bed frame for preventing said structure from tilting with respect to said frame, the said means comprising a member rigidly mounted on said frame and a locking device on said structure for engaging said member when said frame is tilted and thereby prevent further tilting movement.

5. In a bed, the combination with a frame, of bed rails pivoted to said frame, and normally inoperative means for preventing said frame from tilting on to said rails, the said means comprising a gravity actuated pawl and ratchet mechanism on said frame and one of said rails.

ROSS J. ELLSWORTH.